United States Patent [19]

Wolff

[11] 4,036,109

[45] July 19, 1977

[54] DEVICE FOR MOVING AND POSITIONING AN ELEMENT OF A MACHINE

[75] Inventor: Paul Wolff, Illkirch Graffenstaden, France

[73] Assignee: Compagnie Industrielle des Telecommunications Cit-Alcatel, France

[21] Appl. No.: 527,226

[22] Filed: Nov. 26, 1974

Related U.S. Application Data

[62] Division of Ser. No. 363,160, May 23, 1973, abandoned.

[30] Foreign Application Priority Data

May 23, 1972  France ............................... 72.18292

[51] Int. Cl.² .................... F01B 15/00; F15B 13/16
[52] U.S. Cl. .................... 91/216 A; 91/386; 91/461
[58] Field of Search ............ 91/216 A, 216 R, 358 R, 91/358 A, 386, 385, 384, 368, 307

[56] References Cited

U.S. PATENT DOCUMENTS

| | | | |
|---|---|---|---|
| 2,536,965 | 1/1951 | Taylor | 137/625.66 |
| 2,841,168 | 7/1958 | Levetus et al. | 137/625.63 |
| 2,933,105 | 4/1960 | Jerman | 91/461 |
| 3,184,939 | 5/1965 | Eitel | 91/358 R |
| 3,199,410 | 8/1965 | Hereth | 91/461 |
| 3,745,883 | 7/1973 | Ward | 91/386 |

FOREIGN PATENT DOCUMENTS

| | | | |
|---|---|---|---|
| 1,044,005 | 6/1953 | France | 91/358 |
| 2,877 | 2/1909 | United Kingdom | 91/216 R |

*Primary Examiner*—Paul E. Maslousky
*Attorney, Agent, or Firm*—Craig & Antonelli

[57] ABSTRACT

Device for moving and positioning an element of a machine comprising a hydraulically controlled valve shaft sliding in a sleeve and two output ducts in which the oil pressure depends on the position of the valve shaft. The oil pressure in the two output ducts is supplied respectively to two compartments of a hydraulic jack which positions and moves the carriage or slide of a machine tool. Two control chambers in between the valve shaft and sleeve jack include a constant volume part formed between shoulders on the valve shaft and a variable volume part formed by a slidable piston inside of a longitudinally extending cylindrical cavity inside the valve shaft. The cylindrical cavities extend to respective outer ends of said valve piston with fixed stops attached to the sleeve ends. The valve shaft is mechanically coupled to the mobile unit with the jack by a spring biased lost-motion pivot lever connection.

22 Claims, 2 Drawing Figures

DEVICE FOR MOVING AND POSITIONING AN ELEMENT OF A MACHINE

This is a division of application Ser. No. 363,160 filed May 23, 1973, now abandoned.

BACKGROUND AND SUMMARY OF THE INVENTION

The present invention concerns a device for moving and positioning an element of a machine.

Conventional devices for moving and positioning an element of a machine comprise a hydraulic jack comprising two units, a first unit constituted by a hollow body and a second unit constituted by a piston separating the inside part of the body into two compartments into each of which one of the output ducts of a servo-valve leads, one of the two units of the jack being mobile and fast with the element of the machine to be moved.

It has been contemplated to provide a servo-valve which comprises a first and second pressurized fluid output duct, a fluid supply duct and a first and second fluid return duct, a mobile valve shaft controlled by a system of electromagnets and return springs and capable of assuming two operating positions and a rest position. In the rest position of the valve shaft, no fluid is sent into the output ducts. When the electromagnets are under tension, the valve shaft may assume either of the operating positions corresponding to the putting into communication of either of the output ducts with the supply duct. The de-energizing of the electromagnets is effected automatically as soon as the element of the machine has reached the end of its stroke.

The above-described device has several drawbacks. Firstly, it is difficult to adjust the speed of movement of the mobile unit of the jack.

Moreover, when the mobile element starts off, (when the electromagnet is put under tension) and at the end of the stroke, (when the tension of the electromagnet is shut off), the movement of the jack is abrupt, this being detrimental to the proper operation of the machine.

When the tension of the electromagnet is shut off, the jack is not blocked and a drift of the element of the machine occurs.

The device contemplated by the present invention for moving and positioning an element of a machine and not having these above-mentioned drawbacks comprises, a servo-valve provided with a first and second pressurized fluid outlet duct, a fluid supply duct and a first and second fluid return duct and a hydraulic jack comprising two units one of which is mobile in relation to the other, a first element constituted by a hollow body and a second element constituted by a piston separating the inside part of the hollow body into two compartments into each of which leads one of the output ducts of the servo-valve, the mobile unit of the jack being fast with the element of the machine to be moved and positioned and the device is characterized in that the hydraulic servo-valve comprises, firstly, a cylindrical sleeve inside which slides between two end positions a cylindrical valve shaft provided with shoulders separating the inside part of the sleeve into several chambers, including a distribution chamber comprised betweed a first and second shoulder into which the fluid supply duct leads, a first fluid return chamber comprised between the said first and a third shoulder into which the first fluid return duct leads, a second fluid return chamber comprised between the said second and a fourth shoulder into which the second fluid return duct leads;

secondly, a first and second cylindrical bore drilled in the wall of the sleeve and whose openings on the inside surface of the sleeve may be stopped up by the said first and second shoulders whose thickness is nearly the same as the diameter of the said openings, the said first and second pressurized fluid output ducts leading into the said first and second bores, the pressure of the fluid in these output ducts being a function of the degree of stopping up of the openings in the said bores, thirdly, two control compartments whose volumes vary in opposite proportions when the valve shaft moves, fourthly, two control ducts connected with a hydraulic control circuit, each of the control ducts leading into one of the control compartments, and the device is characterized moreover in that the valve shaft of the servovalve is coupled by coupling means to the mobile unit of the jack.

It is thus possible to vary with great accuracy the speed of movement of the valve shaft in both directions by dosing the pressure of the fluid in either of the control ducts.

By means of the servo-valve, the jack is braked at the end of its stroke and any difference in relation to its theoretical stopping position generates an effort which tends to bring the jack back to its original position.

Moreover, by varying the flow in the control ducts, the action of the servo-valve may be controlled and more particularly, a start without a jerk of the jack may be obtained.

These and further features, objects and advantages of the present invention will become more apparent from the following description when taken in connection with the accompanying drawing which shows, for purposes of illustration only, one embodiment in accordance with the present invention and wherein.

DETAILED DESCRIPTION OF THE DRAWINGS

Figure 1:
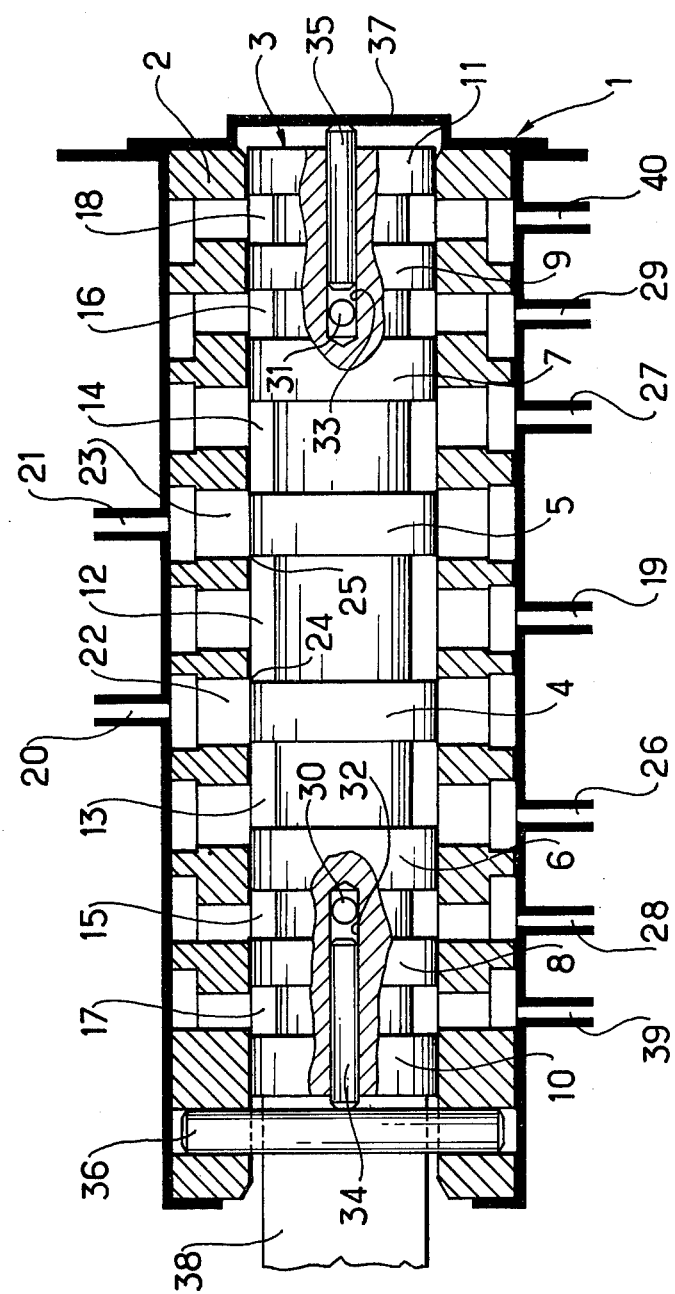
FIG. 1 shows diagrammatically the hydraulic servo-valve used in the device for moving and positioning an element of a machine according to the invention.

The hydraulic servo-valve 1 such as shown in FIG. 1 comprises a cylindrical sleeve 2 inside which slides a valve shaft 3, which is also cylindrical and is provided with eight shoulders 4, 5, 6, 7, 8, 9, 10, and 11, separating the space inside the sleeve 2 into seven toroidal chambers 12, 13, 14, 15, 16, 17 and 18.

The distribution chamber 12, comprised between the shoulders 4 and 5, is supplied with oil by a supply duct 19.

The chamber 12 communicates with two oil output ducts 20 and 21 through two cylindrical bores 22 and 23 drilled radially in the sleeve 2 and whose diameter is slightly greater than the thickness of the shoulders 4 and 5. These bores 22 and 23 are distant from each other by a length equal to the distance separating the shoulders 4 and 5 so that they may stop up simultaneously the central part of the openings 24 and 25 of the bores 22 and 23 on the inside surface of the sleeve 2.

The servo-valve 1 comprises also two oil return ducts 26 and 27 each leading into one of the return chambers 13 or 14 contiguous to the distribution chamber 12.

The actual means for controlling the position of the valve shaft 3 comprise two control ducts 28 and 29 each leading into one of the main chambers 15 and 16 limited respectively by the shoulders 6 and 8 and by the shoulders 7 and 9.

The main chambers 15 and 16 each communicate, through a port 30, respectively 31, drilled radially in the valve shaft 3, with a cylindrical cavity 32, respectively 33, hollowed axially in the valve shaft 3, from one end of that valve shaft.

In each cavity, a mobile piston 34, respectively 35, bearing against a stop 36, respectively 37, is provided, each stop being fast with a different end of the sleeve 2.

The two stops 36 and 37 are also used for limiting the stroke of the valve shaft 3 in both directions.

It will be observed that there is a plate 38 fast with one end of the valve shaft 3 and extending on the outside of the sleeve 2.

Figure 2:
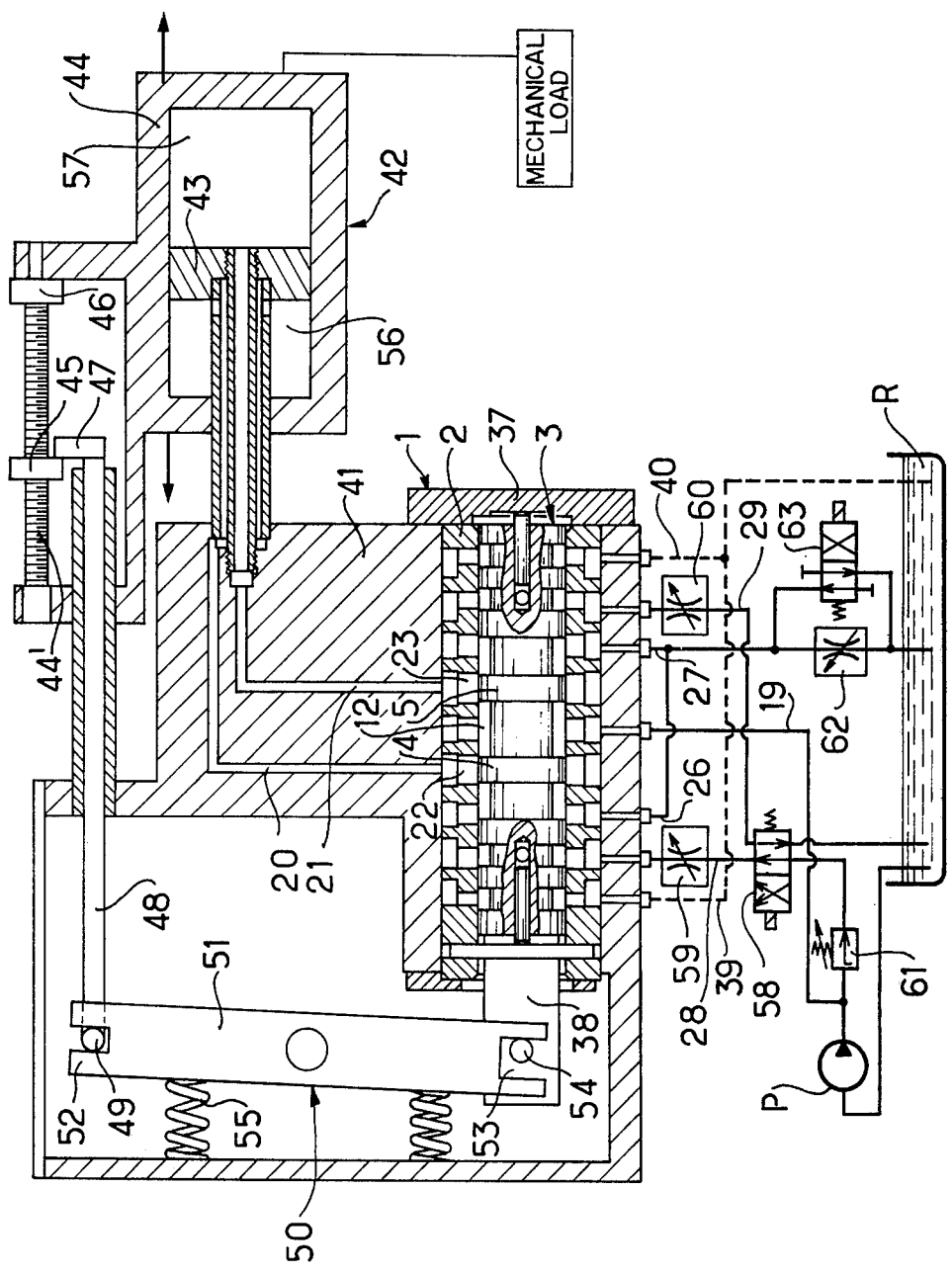
FIG. 2 shows the device for moving and positioning an element of a machine according to the invention.

It will also be observed that there are two drainage ducts 39 and 40 leading into the chambers 17 and 18 limited respectively by the shoulders 8 and 10 and by the shoulders 9 and 11;

In FIG. 2, which shows a device for moving and positioning an element of a machine according to the invention, only the elements necessary for understanding the invention have been illustrated.

This device comprises, more particularly, the servo-valve 1 installed horizontally in a frame 41 and a hydraulic jack 42 whose piston 43 is fast with the frame 41 and whose body 44, mobile horizontally, is fast with the element to be moved, for example, a tool-bearing carriage (not shown).

The body 44 of the jack 42 is fast with a support 44' on which are installed two adjustable stops 45 and 46 intended for limiting the stroke of the tool-bearing carriage.

The stops 45 and 46 at the end of the stroke come into contact with a dog 47 placed at one end of a rod 48 sliding horizontally in a cylindrical cavity of the frame 41 and whose other end 49 is coupled with the valve shaft 3 of the servo-valve by mechanical means 50.

These mechanical means 50 comprise a lever 51 rotating in a vertical plane about an arc perpendicular to that plane and passing through the center of the lever. One end 52 of the lever 51 is articulated with the end 49 of the rod 48 and the other end is provided with a notch 53 in which there is a nipple 54 fast with the plate 38 extending the valve shaft 3 of the servo-valve.

The lever 51 is held on balance in the vertical position by springs 55.

The output ducts 20 and 21 of the servo-valve 1 each lead into one of the compartments 56, respectively 57, of the jack 42.

The device for moving and positioning comprises also hydraulic supply and control means connected with the servo-valve 1.

The oil flowing in the supply duct 19 of the servo-valve 1 comes from an oil pump P pumping oil from a supply R in which the oil return ducts 26 and 27, as well as the drainage ducts 39 and 40, end up.

The control ducts 28 and 29 of the servo-valve 1 are connected to the pump P and to the tank R through a piloting valve 58 having four channels enabling the reversing of the oil flow between these two ducts by varying the voltage of the electromagnet connected with that valve.

It will be observed that there is a throttle 59, respectively 60, on each of the control ducts 28 and 29, and a pressure reducer 61 on the duct connecting the pump P to the piloting valve 58.

Lastly, a throttle 62 short-circuited by a valve 63 operating on a selective basis is arranged on the oil return ducts 26 and 27.

The operation of the device according to the invention is as follows:

When no mechanical thrust on the part of the lever 51 and no hydraulic control thrust is applied to the valve shaft 3, the latter is in the balanced position as long as the shoulders 4 and 5 stop up the openings 24 and 25 of the bores 22 and 23, leaving a passage of the same size free between the distribution chamber 12 and each of the bores 22 and 23.

The oil injected into the distribution chamber 12 is distributed evenly into two thin flows between the bores 22 and 23 whence it escapes in an equal quantity towards the return chambers 13 and 14, in such a way that the oil pressure in the ducts 20 and 21 and the body 44 of the valve 42 remain motionless.

When the piloting valve 58 is in the position shown in FIG. 2, the pressurized oil is injected by the control duct 28 into the chamber 15 and into the cavity 32 and tends to push back the piston 34 which bears against the stop 36 and the valve shaft 3 moves towards the right until it abuts against the stop 37.

The pressurized oil of the distribution chamber 12 passes into the bore 23, then into the duct 21 and is injected into the compartment 57 of the jack 42 in such a way that the body 44 of the jack moves towards the right.

The oil of the compartment 56 of the jack 42 is driven out through the duct 20 and the bore 22 into the return chamber 13.

It is easily observed that the sign and the greatness of the difference in oil pressure between the ducts 20 and 21 depends on the position of the valve shaft 3.

When the shaft 3 is maintained by the hydraulic pressure in the cavity 32 in contact with the stop 37, the quantity of oil injected per unit of time in the compartment 57 of the jack is constant and the body of the jack moves at a constant speed towards the right, driving the stops 45 and 46 whose position has been adjusted in relation to the body of the jack.

When the stop 45 engages the dog 47 of the rod 48, the rod moves towards the right, driving the end 52 of the lever 51 so that the right edge of the notch 53 drives the nipple 54 of the plate 38 towards the left, bringing the valve shaft 3 progressively back towards its balanced position, this ensuring efficient braking of the body of the jack at the end of the stroke (position shown in FIG. 2).

Any slight movement of the body of the jack 42 towards the right causes a slight movement of the valve shaft 3 from its balanced position towards the left and the pressure in the duct 20 then exceeds the pressure in the duct 21, in such a way that oil is injected into the compartment 56 of the jack 42, thus bringing the body of the jack 42 back into its stop position. The valve shaft 3 then again assumes its balanced position under the effect of the oil pressure in the chamber 15.

Likewise, any slight movement of the body of the jack 42 towards the left enables a release of the valve shaft 3 which moves towards the right under the effect of the pressure in the chamber 15. The pressure in the duct 21 becomes greater than the pressure in the duct 20, in such a way that the body of the jack has a tendency to move towards the right and returns to its stop position, bringing back the valve rod to its balanced position.

When the oil flow is reversed by means of the piloting valve 58, the pressurized oil is injected into the control chamber 16 and the valve shaft 3 moves towards the left until it reaches its end position against the stop 36.

The oil pressure in the duct 20 is then greater than the oil pressure in the duct 21 and the body of the jack moves towards the left until the dog 47 engages the stop 46. The rod 48 slides very slightly towards the left, driving the end 52 of the lever towards the left in such a way that the left-hand edge of the notch 53 pushes back the nipple 54, this bringing the valve shaft 3 back into the balanced position. Any slight movement of the body of the jack on either side of its new stop position causes, as in the preceding case, a reaction in the reverse direction bringing the body of the jack back to its stop position.

The throttles 59 and 60 enable the speed of movement of the valve shaft 3 of the servo-valve in one direction or another to be regulated.

The pressure reducer 61 enables the effort exerted by the stops 45 and 46 against the dog 47 to be regulated. It is important to limit that effort to the minimum valve compatible with proper operation, especially if the stops are borne on drums which are required to rotate whereas a stop is in contact with the dog.

By means of the throttle 62, the speed of movement of the body of the jack may be regulated and it is possible to short-circuit that throttle 62 by means of the valve 63, when a rapid movement of the body of the jack is required.

In the device according to the invention, the servo-valve therefore makes it possible to move, at an adjustable constant speed, an element of a machine, between two well-defined end positions by means of adjustable stops.

Moreover, the starting of the element takes place without a jerk, as it is easy to regulate adequately the speed of movement of the valve shaft of the servo-valve.

The servo-valve ensures efficient and progressive braking of the body of the valve when it reaches the end of its stroke.

The device according to the invention may be used for moving and positioning the carriage or the slide of machine tools for copying, outlining etc. and more generally for moving or positioning any element of a machine powered by a hydraulic jack.

According to the use for which the device according to the invention is intended, certain parameters of the servo-valve may be modified, more particularly the shape of the bores (for example elliptical) or materials used (for example cast iron) and the dimensions of the bores, more particularly the dimension in the direction of the axis of the servo-valve which may be, in certain cases, equal to or slightly greater than the thickness of the shoulders.

The servo-valve may also be used reversing the function of the supply and return ducts, this leading to the use of a return chamber comprised between two distribution chambers.

Although the device for moving and positioning an element of a machine which has just been described appears to afford the greatest advantage for implementing the invention, it will be understood that various modifications may be made thereto without going beyond the scope of the invention, it being possible to replace certain of its elements by other capable of ensuring the same technical function or an equivalent technical function therein; more particularly, it is possible to use a jack whose piston is mobile and fast with the element of the machine and whose body is fixed and fast with the servo-valve.

While the preferred embodiments have been disclosed herein it will be apparent that many modifications thereof are feasible without departing the spirit of the invention and it is intended that such modifications are also covered by the appended claims.

What is claimed is:

1. A device including a servo-valve for controlling the flow of pressurized fluid between a supply duct leading into said servo-valve and first and second servo-valve outlet ducts; said servo-valve comprising:
   a sleeve,
   a valve shaft arranged in said sleeve for longitudinal sliding movement relative to said sleeve between two end positions,
   a plurality of shoulders formed on said valve shaft for separating the space between the sleeve means and valve shaft into a plurality of chambers including a distribution chamber communicated with said supply duct which is formed between a first and second of said shoulders, a first fluid return chamber formed between the first shoulder and a third of said shoulders, and a second fluid return chamber formed between the second shoulder and a fourth of said shoulders, said first and second return chambers being connected to respective first and second fluid return lines,
   a first bore leading to said first outlet duct and extending through the sleeve to a first opening located adjacent travel positions of said first shoulder, said first opening having a longitudinal dimension corresponding approximately to the longitudinal thickness of said first shoulder such that said first shoulder effects varying degrees of closing of said first opening during relative movement of said sleeve and valve shaft with a resultant variation in fluid pressure supplied through said first bore to said first outlet duct,
   a second bore leading to said second outlet duct and extending through the sleeve to a second opening located adjacent travel positions of said second shoulder, said second opening having a longitudinal dimension corresponding approximately to the longitudinal thickness of said second shoulder such that said second shoulder effects varying degrees of closing of said second opening during relative movement of said sleeve and valve shaft with a resultant variation in fluid pressure supplied through said second bore to said second outlet duct,
   first and second control compartments having volumes which vary in opposite proportions with respect to one another during relative movement of said valve shaft,
   first and second control ducts leading from a fluid control circuit to said respective first and second control compartments for applying control fluid pressure to said control compartments to control the relative movement of the sleeve and valve shaft;
   and said device further comprising a fluid operated jack having: first and second jack units, one of said jack units being mobile and one being relatively fixed, said first jack unit including a first jack element formed as a hollow body, said second jack unit including a second jack element formed as a piston separating the inside of the hollow body into first and second compartments communicating respectively with said first and second outlet ducts such that changes in pressure supplied to said first and second outlet ducts effects relative movement of said first and second jack units, and wherein said valve shaft is coupled by coupling means with said mobile jack units.

2. A device according to claim 1, wherein the coupling means includes two adjustable stops installed on a support fast with the mobile jack unit and a longitudinally mobile rod, one end of said mobile rod being mechanically coupled to the valve shaft and the other end of said mobile rod including a dog which is engaged by respective ones of the stops when the mobile unit has reached the respective ends of its stroke.

3. A device according to claim 2, wherein said one end of said mobile rod is mechanically coupled to the valve shaft by a spring biased pivot lever, one end of said pivot lever being connected by a pin connection with said one end of said mobile rod, the other end of said pivot bar being connected by a lost-motion pin connection with said valve shaft.

4. A device according to claim 1, wherein each of said control compartments includes a main chamber with constant volume formed between two respective shoulders on said valve shaft and a variable volume space formed between a cylindrical longitudinally extending cavity in said valve shaft and a piston slidingly disposed in said cavity, and wherein respective outer ends of the pistons in said cavities abuttingly engage respective stop means fixed to said sleeve.

5. A device according to claim 4, wherein the coupling means includes two adjustable stops installed on a support fast with the mobile jack unit and a longitudinally mobile rod, one end of said mobile rod being mechanically coupled to the valve shaft and the other end of said mobile rod including a dog which is engaged by respective ones of the stops when the mobile unit has reached the respective ends of its stroke.

6. A device according to claim 5, wherein said one end of said mobile rod is mechanically coupled to the valve shaft by a spring biased pivot lever, one end of said pivot lever being connected by a pin connection with said one end of said mobile rod, the other end of said pivot bar being connected by a lost-motion pin connection with said valve shaft.

7. A device according to claim 6, wherein said main chambers are communicated respectively with said variable volume spaces by radially extending bores in said valve shaft.

8. A device according to claim 5, wherein said hydraulic control circuit includes a flux reversing piloting valve connecting together first and second control ducts at the output of a fluid pump and at a fluid supply.

9. A device according to claim 8, wherein each control duct is provided with an adjustable throttle.

10. A device according to claim 9, wherein a pressure reducer is arranged on the path of the fluid between the pump and the piloting valve.

11. A device according to claim 10, wherein the supply duct is connected to the output of a pump, and wherein the fluid return chambers are connected together and include an adjustable throttle short-circuited by a valve on their common part leading into the fluid supply.

12. A device according to claim 11, wherein said one end of said mobile rod is mechanically coupled to the valve shaft by a spring biased pivot lever, one end of said pivot lever being connected by a pin connection with said one end of said mobile rod, the other end of said pivot bar being connected by a lost-motion pin connection with said valve shaft.

13. A device according to claim 8, wherein a pressure reducer is arranged on the path of the fluid between the pump and the piloting valve.

14. A device according to claim 1, wherein said mobile jack unit is attached to an element of a machine to be moved and positioned.

15. A device for positioning a mechanical element comprising:
a jack including a jack body, a piston separating said jack body into first and second compartments, and a sliding unit, said jack being connected to the mechanical element;
supply means for supplying said jack with a pressurized fluid;
servo-valve means including a fixed sleeve and a valve shaft arranged in said sleeve for longitudinally sliding between two end positions in which said supply means supplies one of said first and second compartments of said jack, said valve shaft having an intermediate position wherein at least one adjustable stop is mounted on said sliding unit, said stop being adjustable according to a predetermined position for said mechanical element, and said valve shaft being operatively fixed through a lever to a member having an end extending to a position relatively adjacent to said adjustable stop, said member contacting said adjustable stop when the displacement of said sliding unit has reached said predetermined position, thereby pushing said valve shaft to said intermediate position,
wherein said servo-valve means further includes two control compartments having volumes which vary in opposite proportions with respect to one another during relative movement of said valve shaft with said fixed sleeve, and a fluid control circuit for respectively applying control fluid pressure to said control compartments to control said relative movement between said valve shaft and said fixed sleeve, said fluid control circuit comprising control ducts for respectively introducing control fluid into each of said control compartments and for releasing said control fluid from each of said control compartments, thereby relieving said control fluid pressure, and
wherein each of said control compartments includes a variable volume space formed between a cylindrical longitudinally extending cavity in said valve shaft and a piston slidingly disposed in said cavity, and wherein respective outer ends of the pistons in each said cavity abuttingly engage respective stop means fixed to said sleeve.

16. A device for positioning a mechanical element according to claim 15, wherein said fluid control circuit includes a flow reversing valve for selectively connecting a respective one of said control chambers to said supply means such that said valve shaft can be positioned at one of said two end positions.

17. A device for positioning a mechanical element comprising:
a jack including a jack body, a piston separating said jack body into first and second compartments, and a sliding unit, said jack being connected to the mechanical element;

supply means for supplying said jack with a pressurized fluid;

servo-valve means including a fixed sleeve and a valve shaft arranged in said sleeve for longitudinally sliding between two end positions in which said supply means supplies one of said first and second compartments of said jack, said valve shaft having an intermediate position wherein at least one adjustable stop is mounted on said sliding unit, said stop being adjustable according to a predetermined position for said mechanical element, and said valve shaft being operatively fixed through a lever to a member having an end extending to a position relatively adjacent to said adjustable stop, said member contacting said adjustable stop when the displacement of said sliding unit has reached said predetermined position, thereby pushing said slidable shaft to said intermediate position, wherein said valve shaft forms a space relative to said sleeve which space is divided into at least five chambers by at least six shoulders formed on said valve shaft, said chambers including:

a central distribution chamber connected to said supply means, and central distribution chamber being formed between a first and second shoulder of said shaft, a first fluid return chamber between said second and a third shoulder of said shaft, a second fluid return chamber between said first and a fourth shoulder of said shaft, a first control chamber between said third and a fifth shoulder of said shaft, and a second control chamber between said fourth and a sixth shoulder of said shaft, said servo-valve means further including a first radial bore through said sleeve connected by a first duct to said first compartment of said jack, a second radial bore through said sleeve connected by a second duct to said second compartment of said jack, wherein said first and said second radial bores through said sleeve have a longitudinal dimension slightly larger than the longitudinal thickness of each of said first and second shoulders such that when the slidable shaft is at said intermediate position fluid pressure on opposite faces of said piston of said jack is substantially the same.

18. A device for positioning a mechanical element according to claim 17, wherein each of said control compartments includes a variable volume space formed between a cylindrical longitudinally extending cavity in said valve shaft and a piston slidingly disposed in said cavity, and wherein respective outer ends of the pistons in each said cavity abuttingly engage respective stop means fixed to said sleeve.

19. A device for positioning a mechanical element according to claim 18, wherein said first and second control chambers are included in first and second hydraulic control circuits, and control circuits including a flux reversing pilot valve connecting said first and second control chambers to said supply means, and wherein an adjustable throttle is provided in each control circuit.

20. A device for positioning a mechanical element according to claim 18, wherein said supply means comprises a supply duct connected to the output of a pump through an adjustable pressure reducing means.

21. A device for positioning a mechanical element comprising:

a jack including a jack body, a piston separating said jack body into first and second compartments, and a sliding unit, said jack being connected to the mechanical element;

supply means for supplying said jack with a pressurized fluid;

servo-valve means including a fixed sleeve and a valve shaft arranged in said sleeve for longitudinally sliding between two end positions in which said supply means supplies one of said first and second compartments of said jack, said valve shaft having an intermediate position wherein at least one adjustable stop is mounted on said sliding unit, said stop being adjustable according to a predetermined position for said mechanical element, and said valve shaft being operatively fixed through a lever to a member having an end extending to a position relatively adjacent to said adjustable stop, said member contacting said adjustable stop when the displacement of said sliding unit has reached said predetermined position, thereby pushing said valve shaft to said intermediate position, wherein said servo-valve means further includes two control compartments having volumes which vary in opposite proportions with respect to one another during relative movement of said valve shaft with said fixed sleeve, and a fluid control circuit for respectively applying control fluid pressure to said control compartments to control said relative movement between said valve shaft and said fixed sleeve, wherein said fluid control circuit includes a flow reversing valve for selectively connecting a respective one of said control chambers to said supply means such that said valve shaft can be positioned at one of said two end positions, and wherein said fluid control circuit includes first and second ducts respectively connecting said two control chambers with said flow reversing valve, each of said first and second ducts including an adjustable throttle valve for regulating the speed of said relative movement of said valve shaft.

22. A device for positioning a mechanical element comprising:

a jack including a jack body, a piston separating said jack body into first and second compartments, and a sliding unit, said jack being connected to the mechanical element;

supply means for supplying said jack with a pressurized fluid;

servo-valve means including a fixed sleeve and a valve shaft arranged in said sleeve for longitudinally sliding between two end positions in which said supply means supplies one of said first and second compartments of said jack, said valve shaft having an intermediate position wherein at least one adjustable stop is mounted on said sliding unit, said stop being adjustable according to a predetermined position for said mechanical element, and said valve shaft being operatively fixed through a lever to a member having an end extending to a position relative to said adjustable stop, said member contacting said adjustable stop when the displacement of said sliding unit has reached said predetermined position, thereby pushing said valve shaft to said intermediate position, wherein said servo-valve means further includes two control compartments having volumes which vary in opposite proportions with respect to one another during relative movement of said valve shaft with said fixed sleeve, and a fluid control circuit for respectively applying control fluid pressure to said control compartments to control said relative movement between said valve shaft and said fixed sleeve, and wherein said fluid control circuit includes first and second ducts respectively connecting said two control chambers with said supply means, each of said first and second ducts including an adjustable throttle valve for regulating the speed of said relative movement of said valve shaft.

* * * * *